March 31, 1964     W. G. BAIRD, JR., ETAL     3,126,680
METHOD OF TREATING PLASTICS
Original Filed Feb. 7, 1958                 2 Sheets-Sheet 1

INVENTORS
WILLIAM G. BAIRD, JR.
CARL A. LINDSTROM, JR.
ARTHUR L. BESSE, JR.
DONALD J. d'ENTREMONT

BY Cushman, Darby & Cushman
ATTORNEYS

March 31, 1964  W. G. BAIRD, JR., ETAL  3,126,680
METHOD OF TREATING PLASTICS
Original Filed Feb. 7, 1958  2 Sheets-Sheet 2

INVENTORS
WILLIAM G. BAIRD, JR.
CARL A. LINDSTROM, JR.
ARTHUR L. BESSE, JR.
DONALD J. d'ENTREMONT
BY Cushman, Darby & Cushman
ATTORNEYS United States Patent Office 3,126,680
Patented Mar. 31, 1964

3,126,680
METHOD OF TREATING PLASTICS
William G. Baird, Jr., Winchester, Carl A. Lindstrom, Jr., Arlington, Arthur L. Besse, Jr., Weston, and Donald J. d'Entremont, East Boston, Mass., assignors to W. R. Grace & Co., Cambridge, Mass., a corporation of Connecticut
Original application Feb. 7, 1958, Ser. No. 713,848, now Patent No. 3,022,543, dated Feb. 27, 1962. Divided and this application Apr. 6, 1961, Ser. No. 131,697
2 Claims. (Cl. 53—3)

The present invention relates to irradiated polyethylene and to methods of making polyethylene film with improved physical characteristics.

This application is a division of our copending application, Serial No. 713,848, which is now Patent No. 3,022,543.

Polyethylene is finding increasing usage as a packaging material. However, due to the fact that regular polyethylene does not have high shrink energy, it cannot be utilized satisfactorily in a process such as the Cryovac process wherein a piece of meat, for example, is placed in a bag formed of heat-shrinkable plastic film, the bag evacuated, sealed and heated by contact with hot air or contact with hot water or other fluid to shrink the bag about the meat to eliminate dead spaces between the meat and the bag to increase preserving qualities and also eliminate wrinkles of the film and improve overall appearance of the package.

The Cryovac process results in a virtual second skin of protective film.

Various other shrinking films of polyethylene have been tried in the Cryovac process, but all have been unsatisfactory for one or more of the following reasons:

(1) The shrink is in one direction only.
(2) The forces that cause the film to shrink when unsupported are insufficient to overcome the frictional forces between the film and the meat.

Either of these difficulties results in a package which has excess wrinkles remaining after shrinking and, therefore, does not present a pleasing appearance for a commercial package.

(3) The materials require temperatures above boiling water for optimum results.
(4) It has been much more difficult to satisfactorily control the process for making bilaterally oriented polyethylene.

It is an object of the present invention to produce a novel form of bilaterally oriented polyethylene.

Another object is to prepare polyethylene film or tubing having a strong biaxially shrinking force incorporated therein, i.e., polyethylene having high shrink energy.

A further object is to prepare polyethylene film having greatly increased tensile strength over conventional polyethylene film especially at high temperature, e.g. 88° C. to 100° C. This is advantageous in some instances in enabling a product to be cooked in the bag.

A still further object is to prepare polyethylene film having increased tensile strength at room temperature.

An additional object is to prepare irradiated polyethylene having improved shrink properties, e.g., below the boiling point of water.

Yet another object is to prepare polyethylene, e.g., high density polyethylene, having improved low temperature flexibility and toughness.

A still further object is to improve the optical properties of polyethylene, more specifically to improve the clarity and surface gloss.

A further object is to improve the gas transmission properties of irradiated polyethylene, or unirradiated polyethylene.

Another object is to improve the stability of the polyethylene bubble obtained in racking polyethylene.

Another object is to improve the ability of the polyethylene to be continuously oriented in the form of a racking bubble by previous irradiation, and retain its dimensions in subsequent use for flexible food bags, etc.

Yet another object is to improve the sealing characteristics of polyethylene, particularly in connection with foods such as poultry, meats, etc. and including overwrapped packages where multiple layer sealing is required and packaging where labels with thermoplastic adhesives are used.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be obtained by heating the polyethylene to a working temperature, preferably stretching the polyethylene while above room temperature in at least one direction for more precise control of the final properties of the film, (1) cooling the heated polyethylene to a temperature sufficiently low to maintain its form through stages of mechanical handling, e.g., not over room temperature, (2) irradiating the polyethylene at a dosage of at least $2 \times 10^6$ rep., (3) heating the irradiated polyethylene at a temperature where the polyethylene will soften sufficiently to stretch but also at a temperature at which the tubing will not break; these temperatures, as those skilled in the art realize, will vary depending upon the particular polyethylene used and the amount of irradiation employed; and then bilaterally stretching to orient the polymer at such elevated temperature, and (4) cooling the stretched polymer while under tension to a temperature at which the polymer will retain its form when the tension is released.

The term "working temperature" is employed to designate that temperature at which the polyethylene can be permanently deformed into a new mechanism shape or dimension. For continuous operation of the process, it has been found that the much preferred procedure for bilaterally stretch orienting is with the aid of a polyethylene bubble, as hereinafter described.

A rep., as is recognized in the art, is defined as that amount of nuclear radiation which dissipates 93 ergs of energy per gram of tissue producing $1.61 \times 10^{12}$ ion pairs in the process. It is approximately equal to the amount of energy that would be dissipated by a one roentgen X-ray beam in a gram of tissue.

An alternative unit which is now employed is the rad. which is defined as representing 100 ergs/gram imparted by ionizing particles to the irradiated material at the point of interest, Glasstone "Principles of Nuclear Reacter Engineering" (1955) page 547.

It is desirable that steps 1, 2, 3 and 4 above be employed in the order given. The use of cooling step 1 is to facilitate the further handling and processing of the polyethylene without difficulty and when quenching is employed for the cooling, it further permits the process to be carried out more rapidly with an appreciable saving of time and equipment. Irradiation step (2) is essential in order to stabilize the bubble in step (3). The use of irradiation step (2) makes an otherwise inefficient process work with outstanding success. Irradiation after bilaterally stretch orienting step (3) is obviously not effective in stabilizing the orientation step and is ineffective in preparing film having the high shrink energy and certain other desirable properties of polyethylene film made according to the present process.

Step (4) is necessary in order that the tension created by stretch orienting may be released without premature shrinking of the polyethylene.

The improvement in the properties of polyethylene prepared according to the present invention compared to a standard polyethylene is shown in the following table wherein in both cases the starting material was Alathon 14 (a high pressure, branched chain polyethylene having a melt index of 1.8 and an average molecular weight of about 20,000).

| Property | Quenched, irradiated, racked polyethylene | Standard polyethylene |
| --- | --- | --- |
| Yield, sq. in./lb. mil | 30,000 | 30,000. |
| Density | 0.916 | 0.916. |
| Tensile strength, p.s.i. (22° C.) | 5,000 to 18,000 (usually 8,000 to 16,000). | 1,350 to 2,500. |
| Tensile strength, p.s.i. (93° C.) | 1,500 to 3,000 | 100 to 200. |
| Elongation, percent | 100 to 200 | 50 to 600. |
| Heat sealing range, ° C | 150 to 300 (and above). | 110 to 150. |
| Percent shrinkage at 96° C | 20 to 55 | 0 to 60. |
| Shrink energy, p.s.i. (96° C) | 100 to 500 | 0 to 10. |
| Clarity (indicated by low haze) haze, percent. | 2.5 to 6.0 | 30. |
| Gloss (indicated by low diffuse reflectance) diffuse reflectance, percent. | 0.5 to 1.0 | 2.0 to 3.0. |
| Moisture vapor transmission (gm./24 hr./100 sq. in./mil). | 1.1 to 1.2 | 1.2. |
| Oxygen permeability (cc./24/hr./sq. meter/atm./mil.). | 6,000 | 9,000. |

Shrink energy is defined as the force of contraction at a given temperature when the material is restrained, more specifically, it is defined as the measurable tension produced in a fully monodirectionally restrained strip of film when heated to the specified temperature. Sometimes shrink energy is referred to as shrink tension.

It is surprising that the present polyethylene film is more flexible than conventional polyethylene. It would be expected that the increased orientation due to stretching and the increased cross-linking due to irradiation would render the polyethylene film more brittle, but the contrary is the case.

It has also been observed that the polyethylene film of the present invention will tear along any desired line much more readily than regular polyethylene once an initial break is made in the film. This increases the ease in opening packages. Furthermore, it has been found that the increased tensile strength of the present polyethylene film permits reduction in the thickness of the film used in wrapping. For example, 1.5 mil film can be used where previously 3 mil polyethylene film was employed as is emphasized by the increased tensile strength.

Another important advantage of the polyethylene film prepared by the present process is utility in producing an "overwrap" food package. With this material is is possible to prepare an "overwrap" sealed package in which the packaging material will shrink uniformly about the product in contrast to the normal "overwrap" materials, such as cellophane and other conventional "overwrap" materials which do not have this characteristic. In this connection, the "overwrap" package is more readily sealed, and the seal is more effective than with conventional polyethylene materials and one of the striking improvements made possible by this invention is the elimination of characteristic wrinkles which have been objectionable with conventional materials employed to produce "overwrap" packages.

The materials of the present invention show marked improvement where multilayer sealing is employed in this connection. Additionally it has been found that the materials of this invention can be satisfactorily employed to receive labels having thermoplastic adhesives, i.e., the application of such adhesives or multilayer sealing does not result in burning holes in the polyethylene as is sometimes encountered with conventional polyethylene.

It is also possible to seal together a thin piece of the present irradiated polyethylene with materials which are substantially thicker in cross section or which have a substantially higher softening point than such thin piece of irradiated polyethylene; thus high density or low density polyethylene can be employed as the thicker material. Alternatively the irradiated polyethylene of the present invention can be united to a higher softening polyethylene or other higher softening thermoplastic of the same thickness as the irradiated polyethylene to form a package.

Likewise the high shrink energy irradiated polyethylene can be sealed to polyethylene of lower softening temperature.

The high temperature strength at which the irradiated polyethylene of the present invention is tacky and sealable enables it to be sealed with a variety of materials varying in thickness and softening point.

In this connection in place of polyethylene there can be used any polyolefin or polyolefin compounds which will cross link upon irradiation. Furthermore, while irradiated polyethylene, e.g., Irrathene, is normally considered harder to seal than regular polyethylene, the polyethylene of the present invention seals more easily than conventional polyethylene. The products of the present invention have improved hot cohesive seal strength which makes them particularly useful in applications requiring high speed heat sealing. This instantaneous hot strength precludes the necessity for cooling the sealing jaws of conventional, hot sealing devices.

The polyethylene film produced by the process of the instant invention normally is prepared so as to shrink at least 30% in each direction and up to 60% at 96° C., although larger or smaller shrinkage may be convenient for special usages, with a shrinking force of 100 p.s.i. up to a shrinking force of 500 p.s.i.

The biaxial orientation is desirably accomplished by careful balancing of the deformation stress of the initially thick material at orientation temperature and the tensile strength of the final relatively thin material, i.e., the deformation stress of the initial thick polyethylene is low enough and the tensile strength of the final polyethylene high enough so that the mechanical force necessary to stretch the thick material at orientation temperature will not break the thin film. The initial thickness of the polyethylene film can be 4 to 60 mils, desirably 6 to 25 mils and the final film thickness 0.25 to 4 mils, desirably 0.5 to 1.5 mils. The diameter of the polyethylene tube (so called tape) is generally 0.5 to 12 inches and even greater if circumstances require and the diameter after the bilateral stretch is generally 100 to 900% greater than the original inner diameter.

In the preferred form of the invention regular low density polyethylene is used. Thus while Alathon 14 was used in many of the specific examples described below, there can be used various conventional polyethylenes which are solid at room temperature. The polyethylene may have a molecular weight of 7,000, 12,000, 19,000, 21,000, 24,000, 30,000, 35,000 or even higher. There can be employed either high pressure or low pressure polyethylene and either high, medium or low density polyethylene. While the polyethylene per se forms no part of the present invention since the invention is useful in connection with various of the polyethylenes now commercially available, in some cases, it appears preferable to gain advantages either in irradiation efficiency or in the properties of the final film to blend in appreciable amounts of other polyethylenes containing larger than average amounts of certain specific groups, e.g., vinylidene, vinyl and vinylene, etc.

Optionally, it has been found useful to incorporate additives in minor amounts into the film before irradiation. Among such additives are ketones, e.g., benzophenone, and other ultra-violet sensitizers.

While the present invention is preferably employed utilizing solid polyethylene as the material which is (1) heated, mono or biaxially stretched to a limited extent and cooled, (2) irradiated, (3) then heated and stretched to produce biaxial orientation and high shrink energy, and (4) cooled while under tension there can also be used in the process of the invention solid polypropylene, solid copolymers of ethylene and propylene (e.g., a 50–50 copolymer) and solid copolymers of ethylene with a minor amount, e.g., 5% of isobutylene, amylene, acetylene, butadiene, butene 1 and butene 2 or block copolymers of polyethylene with a minor amount, e.g., 5% of polyisobutylene. Also graft polymers of polypropylene or polyethylene with monomers such as acetylene, butadiene, butylene, ethylene or propylene can be used.

Several methods can be used to produce a tubing satisfactory as a starting material. In the preferred procedure, polyethylene can be extruded from the circular die of a conventional extruder in the form of tubing at a temperature of 120 to 260° C. and drawn down into a bath of water or other inert liquid at a temperature which will promote mechanical and handling stability, e.g., below 93° C., preferably not over room temperature, and through a pair of pinch rolls. Preferably, the inside of the tubular material is filled with a liquid, e.g., water, to aid in the cooling and/or expanding of the plastic. Optionally the liquid contains a small amount of an antitack material, e.g., talc, diatomaceous earth or polyethylene powder which will deposit on the inside wall of the tube to prevent its adhesion when subsequently pressed flat by the deflate rolls. In this procedure, the diameter of the cooled polyethylene tubing resulting varies from about 40 to 200% of the die orifice diameter and the longitudinal stretch varies 50 to 500%.

An alternative method comprises taking the tube from the die orifice in any convenient direction to a pair of feed rolls and inflating the tube with a gas, e.g., air, to stretch it and cool it by maintaining a bubble between the face of the die and a pair of pinch rolls located at a fixed distance, e.g., at least 2 bubble diameters from the face of the die. In this procedure the polyethylene is usually stretched 100 to 500% laterally and 100 to 500% longitudinally. It is more difficult to control the conditions in this procedure than in the water quench method, the latter procedure being more readily manipulatable and more economic and lending itself more readily to the preparation of thick tubing.

Irradiation can be accomplished by various methods. Thus, there can be used electrons, X-rays, gamma rays by employing iron 59 or cobalt 60, B-rays, e.g., by employing cobalt 60, carbon 14, phosphorus 32, strontium 90, ultra-violet light above 2000 A. and below 2700 A., e.g., 2537 A., etc. Preferably, electrons of at least $10^5$ electron volts energy are employed. The irradiation source can be a Van der Graaff type electron accelerator, manufactured by the High Voltage Engineering Corporation, Burlington, Massachusetts. This machine can be operated at 2,000,000 volts with a power output of 500 watts. Alternatively, there can be employed other sources of high energy electrons, such as the General Electric 2,000,000 volt resonant transformer unit or the corresponding 1,000,000 volt, 4 kw., General Electric resonant transformer or a linear accelerator.

The time of irradiation is not critical but need merely be sufficient to give a dosage of sufficient rep. The voltage, likewise, can be varied quite widely, but irradiation is desirably high, e.g., 750,000 or 1,000,000 or 2,000,000 or 3,000,000 or 6,000,000 volts, or even higher. By appropriate combination of time of treatment, voltage and beam current the desired rep. dosage is obtained.

The irradiation of polyethylene is carried out at dosage between about 6 megarep. and about 75 megarep., desirably between 8 and 20 megarep. less than 6 megarep. can be utilized with certain types of polyethylene or with the use of additives as recited above, e.g. 4 megarep. and even as low as 2 megarep. It is important to control the dosage so that there is a slight amount of cross-linking, in order that on subsequent heating to the range of the Vicat softening temperature of the corresponding unirradiated polyethylene considerable deformation is possible. If too much irradiation is employed, this ability to deform is lost and the tensile strength decreases. On the other hand, if the irradiation dosage is too low, the necessary increase in high temperature tensile strength is not obtained, and it is more difficult to maintain satisfactory conditions in the subsequent racking. Irradiation is generally carried out at any temperature up to that which will not impair the mechanical stability of the polyethylene e.g., up to about 60° C. Room temperature is preferred for economic reasons. However, slightly higher efficiency is obtained at higher irradiation temperatures.

As previously indicated, an irradiation dosage of 8 to 20 megarep. is preferred since with this dosage there is obtained the required increase in high temperature tensile strength necessary combined with the low resistance to initial deformation of the tubing. In the last step in the process the irradiated material is heated and stretched biaxially. With regular low density polyethylene (not over about 0.920) the irradiated material is usually heated to 90 to 102° C., although temperatures as low as 65° C. can be employed. The stretching is done to an extent of 100 to 900% in the lateral direction and 100 to 700% longitudinally as compared with the initial polyethylene tubing prior to stretching. If the polyethylene is in the form of a tube, it can be introduced into a hot water bath, 88 to 102° C., through a pair of feed rolls immersed in the hot bath, and subsequently inflated with air, or other gas or liquid, e.g., water, to form a bubble in the section of the tube between the surface of the hot bath and the deflate rolls located above. The bubble is then normally air cooled, e.g. to room temperature before passing through deflate rolls. The polyethylene is fed in the form of tubing at low or high speeds, e.g., 1 to 40 feet/minute into the bath.

After the bilateral stretching, the polyethylene tubular film is cooled, either rapidly or slowly, resulting in the locking of the molecules in their new position. Generally, the cooling is done to room temperature. After cooling and releasing of tension, subsequent heating allows release of the shrink energy which tends to return the polyethylene to its original shape and size as in the normal Cryovac packaging operation for example. In brief the product has a controllable shrinkage.

Figure 1:
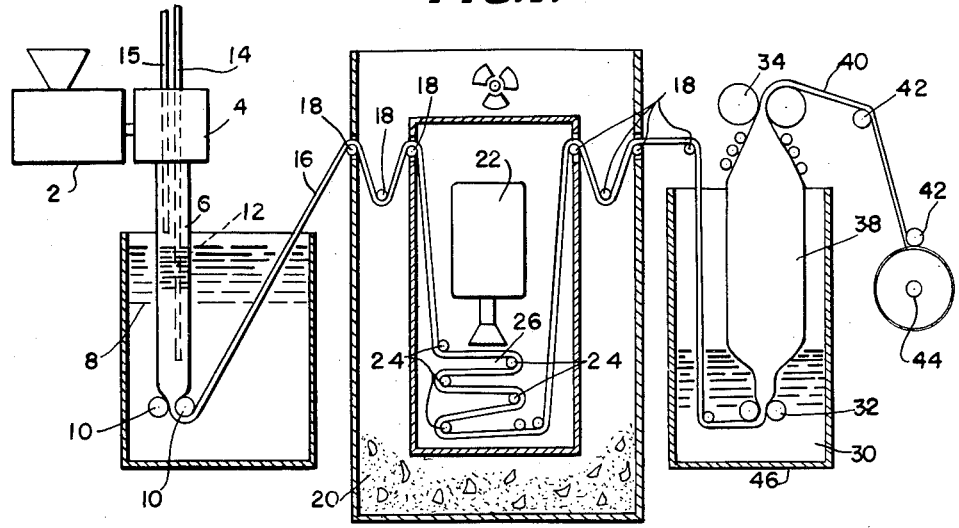
FIGURE 1 is a schematic diagram of the preferred method of carrying out the invention.

Referring more specifically to FIGURE 1, raw polyethylene is fed into a conventional saran-polyethylene type extruder 2, specifically a 3½" Hartig electrically heated extruder, and extruder at a temperature of 138 to 160° C. through the ring die orifice in a die head 4 to form a soft plastic tube 6. The die head is positioned to extrude the tube downwardly into a cooling bath of water 8 or other inert liquid maintained at a temperature preferably between −18° C. and +21° C., usually 4 to 16° C. The extruded tube is quickly chilled in this bath. The distance between the die orifice and the surface of the cooling liquid is kept small, e.g., 1 to 6 inches, to avoid undesirable distortion of the soft, freshly extruded tube. The extrusion temperature and the temperature of the cooling bath will vary to some extent depending on the particular polymer being extruded.

The extruded tube is withdrawn from the die orifice downwardly through the cooling bath by a pair of driven rolls 10 rotating at a surface speed of 8 to 40 feet/min. immersed in the cooling liquid. The two rolls are preferably both driven by gears to prevent slipping. The speed of withdrawal is generally 100 to 300% greater than the speed of the polymer at the die face to avoid undue sagging of semi-fluid plastic as it issues from the die orifice as well as to control the end product film shrink characteristics.

As the tube passes through the cooling bath, a liquid 12 inert to the polymer, e.g., water, is recirculated through ducts 14 and 15 in the die head into the newly formed tube. This liquid is maintained at a substantially constant head with respect to the level of the cooling fluid in the bath and maintained at a substantially constant temperature. The pinch rolls 10 serve to prevent the carrying of other than a trace of liquid material out of the cooling zone inside the tube.

The diameter and wall thickness of the tube thus formed depend upon the dimensions and shape of the die orifice, head of liquid material within the tube, pressure in the tube, speed of the polymer through the die orifice, and the speed with which the tube is withdrawn from the orifice by the pinch rolls. The wall thickness may vary from 4 to 60 mils in thickness and the diameter can be any convenient size, e.g., 0.5 to 12 inches.

The flattened tubing or tape 16 is fed through feed rolls 18 into a vault 20 which houses and encloses an electron generator 22. By the use of a festooning arrangement 24, the tape is caused to pass through the electron beam 26 of the generator. (The generator in the examples is a 2 million volt Van der Graff electron accelerator.) The irradiation dosage can be varied as indicated above and is usually within the range of 8 to 20 magareps. for low density polyethylene. Personnel are shielded from the effect of spurious irradiation by means of the cement vault 20. The temperature within the vault is maintained at approximately 4 to 27° C.

Following irradiation, the tape is fed by feed rolls to a hot bath 30 in racking tank 46 which contains water, or other liquid insert to the polymer. This liquid is maintained at a temperature between that at which there is a substantial, e.g. 25%, reduction in the crystallinity of the irradiated polyethylene and the point at which the tensile strength of the particular irradiated polyethylene tubing in unstretched form decreases unduly, e.g. to below 50 p.s.i. For low density polyethylene this temperature is between 88 and 102° C., desirably, preferably 96° C. The tape is fed from a pair of feed rolls 32 rotating at a surface speed of 8 to 40 feet/min., and immersed in the hot bath, to a pair of deflate rolls 34 mounted above the hot bath and rotating at a surface speed of 20 to 80 feet/min. Air or other gas is introduced into the heated tape to form a gas bubble 38 between the surface of the hot bath and the upper deflate rolls 34 in the air. The film is cooled as it passes in the air from the surface of the hot bath to the deflate rolls. The bubble is gradually flattened with the aid of converging rolls 36. The diameter of the gas bubble is generally 6 to 60 inches and the speed differential between the pair of feed rolls 32 and the pair of deflating rolls 34 is usually a ratio of from 3 to 1 up to 4 to 1. In general, the diameter of the gas bubble and the speed differential between the pair of feed rolls 32 and the deflate rolls 34 is such as to produce a stretch of from 3 to 1 up to 5 to 1 in each direction, preferably a stretch of 4 to 1 in each direction. Further stretching increased both the tensile strength and the shrinking force and is limited only by the point at which the polyethylene will break. Following the collapse of the bubble by deflate rolls 34, the flattened tubing 40 is fed with the aid of guide rolls 42 to roll 44 on which it is wound. The finished tubing generally has a thickness of 0.5 to 3 mils.

It is important that the neck 48 of the bubble be immersed in the water. If the bubble is entirely out of the water, it will not inflate properly, while if the bubble is completely immersed, it will burst too easily. In general a major proportion of the expansion of the tube takes place in the water. Usually 50 to 95% and preferably 70 to 95% of the expansion occurs in the water and the balance in the air which acts as a cooling medium. When it is desired to make film from the tubing, this can readily be accomplished by slitting the tubing as it leaves deflate rolls 34.

Figure 2:
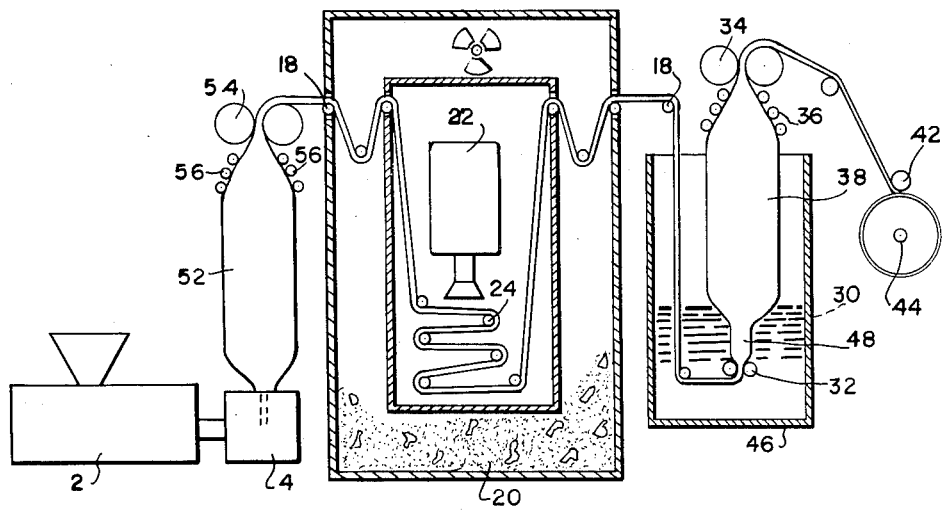
FIGURE 2 is a schematic illustration of an alternative method.

In the alternative form of the invention illustrated in FIGURE 2, the polyethylene tubing 16 as it leaves the die head 4 in an upward direction is formed into a bubble 52 with the aid of air or other entrapped gas maintained between the die head 4 and deflate rolls 54. The gas bubble generally has a diameter of 2 to 15 inches. Deflate rolls 54 are rotated at a surface speed of 5 to 20 feet/min. In this manner, the extruded tubing is given an initial lateral stretch of 50 to 200% and an initial longitudinal stretch of 50 to 300%. The gas bubble is flattened at the upper end with the aid of converging rolls 56. The flattened tube 18 is then further processed in the same way as in FIGURE 1.

The irradiation in vault 20 can be carried out in the presence of air, but preferably is done in nitrogen, argon, helium or other inert gas.

It is also possible to irradiate in an atmosphere of chlorine gas or to chlorinate before, e.g. at the extruding die, or after irradiation in order to improve the printability or reduce the permeability of the tubing or film produced.

Immediately before, during, or after irradiation, the polyethylene film can be coated, e.g., with a vinylidene chloride polymer like saran, such as saran F–120 (vinylidene chloride-acrylonitrile copolymer) or other material to change the surface characteristics of the film. Alternatively, the finished film can be coated with saran F–120 or other coating in any conventional manner, to afford a barrier to the passage of gasses, moisture and liquids.

Figure 3:
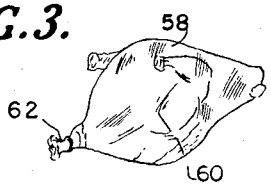
FIGURE 3 is a view showing poultry in a bag of the material of the present invention.

The finished tubing and film of the present invention can be used as shrinkable packaging material to package poultry, e.g., turkeys and chickens, or other products such as hams, frankfurters, cheese, pickles, etc. In FIGURE 3 there is shown a turkey 60 in a bag 58 made from tubing of the present invention. The bag is closed at neck 62 and is shrunk in 96° C. water to conform to the dimensions of the turkey. Likewise, the tubing and film can be printed on, colored or made impermeable to oxygen and/or other gases if desired. It can be used in place of cellophane to wrap meat, e.g., steak and shops. When so used, it has the advantage compared with cellophane of superior resistance to water, as well as having the ability to be formed into a wrinkle-free package.

Figure 4:
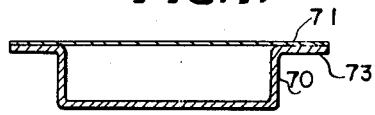
FIGURE 4 is a cross section of a container having a body of thick plastic material and a cover of the irradiated polyethylene of the present invention heat sealed thereto.

Referring to FIGURE 4, the numeral 70 indicates the body of a container shown for purposes of illustration only as of the shallow type used frequently with a peelable cover for containing jams, jellies, etc. As shown, this body 70 is relatively thick compared to the thickness of the irradiated polyethylene film forming the readily peelable cover 71. We have found that the body 70 may be made of various suitable thermoplastic materials such as polyethylene and that although a high temperature is frequently required to soften or render tacky the material of the body by reason of its thickness or softening point or both, such temperatures surprisingly do not melt or deteriorate the irradiated film material of the cover 71, so that the irradiated film constituting the cover is directly adhered to the flange 73 of the body upon which it is superposed and directly united by heating without requiring an interposed adhesive or other expedients and yet allow the cover film 71 to retain its film identity, strength and clarity and to be readily peeled off the body to give access to the contents. Thus we have a container of a thick plastic material body 70, and a thin film polyethylene cover 71 adhered directly thereto but readily peelable to form a desirable package.

Figure 5:
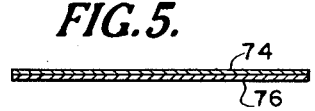
FIGURE 5 is a section showing a layer of the irradiated polyethylene of the present invention heat sealed to a layer of a plastic of higher softening temperature.

Also we have as shown in FIGURE 5 a high shrink energy polyethylene film 74 of this invention cohesively sealed to a layer of higher softening temperature thermoplastic material 76, e.g. polyethylene. The thermoplastic material of the layer 76 may have a higher softening temperature than ordinary polyethylene films as with the material 70 of FIGURE 4 or it has, in some cases, a lower softening temperature. Again as shown in FIGURE 5 the thickness of the layers 74 and 76 are sometimes equal and one or both of the said layers is irradiated according to this invention. The layers are directly adhered in FIGURE 5 without use of an adhesive or other expedient to promote adhesion, the superposed layers being made tacky by heating without distorting or deteriorating them as described in connection with FIGURE 4.

Figure 6:
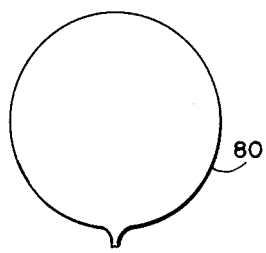
FIGURE 6 shows a balloon made of the material of the present invention.

FIGURE 6 shows a balloon 80 made of materials prepared in accordance with this invention, e.g., polyethylene, polypropylene, etc.

Figure 7:
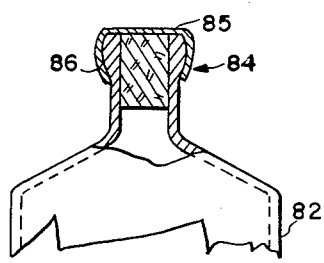
FIGURE 7 is a cross section of a bottle closure formed of a capsule of the material of the present invention shrunk upon the neck of the bottle.

As shown in FIGURE 7 a bottle 82 is provided with a closure 84 having top and skirt portions 85 and 86 respectively formed as a capsule of the material of the present invention which has been shrunk with the aid of heat upon the neck of the bottle to form a tight seal. In some cases the capsule merely includes a band or skirt portion 86 and does have a top portion 85.

Figure 8:
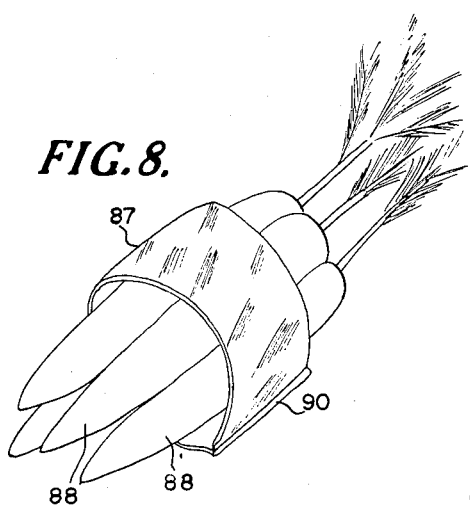
FIGURE 8 is a view showing a multiplicity of elongated articles, e.g., lumber, carrots, toothpicks, celery, turnips, beets, onions, etc., loosely wrapped into a bundle with a band of the material of the present invention. Alternatively one or more compressible materials, e.g. a blanket can be wrapped in this manner.
Figure 9:
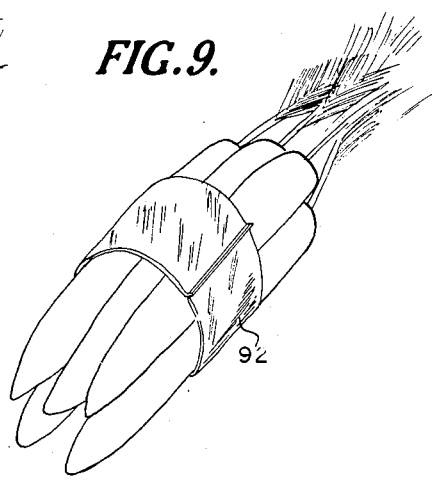
FIGURE 9 is a view similar to FIGURE 8 after the band has been shrunk upon the bundle.

In FIGURE 8 a band 87 of the material of the present invention is wrapped loosely around a multiplicity of articles 88, e.g., carrots, and heat sealed as shown at 90 between heated sealing jaws. Where formerly a tight wrap was used, it was essential to hold the sealing jaws in contact for a time which was uneconomic, otherwise the seal would separate. The present method allows the sealing jaws to be removed substantially instantaneously. The loosely wrapped sealed product is now heated, by being placed for a few seconds in water at 96° C., to form a tight wrapping 92 as shown in FIGURE 9 by shrinking the tube 87 on the bundle. Instead of hot water a blast of hot air may be used to shrink the tube tightly upon the articles as they pass through a heating chamber or by the hot air blast.

*Example 1*

Using the apparatus described in FIGURE 1 Alathon 14 was extruded at a temperature of 150° C. at an extrusion rate of 60 lbs./hr. to form a tube 6 having a wall thickness of 10 mil and a diameter of 3.5 inches using a die diameter of 4 inches. Cooling bath 8 was filled with water maintained at 15° C. The distance between the die orifice and the surface of bath 8 was 2 inches. Rolls 10 were rotating at a surface speed of 23 ft./min. (The longitudinal stretch between the die 4 and the pinch rolls 10 was 200%.) Water at a temperature of 15° C. was recirculated through ducts 14 and 15 to maintain the head of liquid 12 at approximately 2 inches below the die. The tubing was passed under the beam of the electron accelerator 22 operating at $1 \times 10^6$ volts for 15 passes to give a dosage of approximately 12 megarep. The temperature in the vault 20 was maintained at 21° C. The hot bath 30 contained water maintained at 94° C. Feed rolls 32 rotated at a surface speed of 24 ft./min., and deflate rolls 34 at a surface speed of 72 ft./min. Air bubble 38 in its main portion had a diameter of 17.5 inches and 85% of the expansion of the bubble took place below the surface of the water. The transverse stretch was 5 to 1 and the longitudinal stretch 3 to 1. The finished tubing had a wall thickness of approximately 0.7 mil.

The resulting irradiated and bilaterally hot stretched polyethylene had the following properties:

| | |
|---|---:|
| Tensile strength, 21° C., p.s.i. | 10,000 |
| Tensile strength, 93° C., p.s.i. | 3,000 |
| Elongation, 21° C., percent | 100 |
| Heat sealing range, ° C. | 150–315 |
| Shrink at 96° C., percent transverse | 50 |
| Shrink at 96° C., percent longitudinal | 35 |
| Shrink energy at 96° C., p.s.i. | 300 |
| Clarity, haze, percent | 2.5 |
| Gloss, diffuse reflectance, percent | 0.7 |
| Oxygen permeability (cc./24 hr./sq. meter/atm/mil.) | 6,000 |
| Moisture vapor transmission (gm./24/hr./100 sq. in./mil.) | 1.2 |

The biaxially stretched polyethylene bubble was cooled in the air as shown.

*Example 2*

Using the same apparatus as in Example 1 with the change that intermediate windups and unwinds were used before and after irradiation to give an intermittent process, Alathon 14 was extruded at a temperature of 150° C. at an extrusion rate of 60 lbs./hr. to form a tube having a wall thickness of 25 mil and a diameter of 1.5 inch using a die diameter of 2 inches. The cooling bath was filled with water maintained at about 15° C. and the distance between the die orifice and the surface of the bath was 2 inches. Rolls 10 were rotating at a surface speed of 21 feet/min. The longitudinal stretch between the die and pinch roll was 200%. Water at essentially the same temperature as the bath was recirculated through ducts 14 and 15 to maintain the head of liquid 12 at approximately 2 inches below the die. The tubing was passed under the beam of the electron accelerator 22 operating at $2 \times 10^6$ volts to give a dosage of approximately 15 megarep. The temperature in the vault was maintained at 21° C. The hot water bath was maintained at 98° C., and feed rolls 32 rotated at a surface speed of 22 ft./min. while deflate rolls 34 rotated at a surface speed of 66 ft./min. Air bubble 38 in its main portion had a diameter of 7.5 inches and 95% of the expansion of the bubble took place below the surface of the water. The transverse stretch was 5 to 1 and the longitudinal stretch 3 to 1. The finished tubing had a thickness of approximately 1.6 mils.

The resulting irradiated and bilaterally hot stretched polyethylene had properties similar to those of the product of Example 1, the primary difference being that the product of Example 2 had a tensile strength at 21° C. of 12,000 p.s.i., an elongation at 21° C. of 75% and a haze of 3%.

*Example 3*

Example 1 was repeated with the following changes. The extrusion rate was reduced from 60 lbs./hr. to 40 lbs./hr., the tube diameter was reduced from 3.5 inches to 3 inches, the die diameter was reduced from 4 inches to 2 inches, the distance between the die orifice and the surface of the bath was increased from 2 inches to 3 inches and rolls 10 were rotated at 18 ft./min., rather than 23 feet/min. Water was recirculated through ducts 14 and 15, to maintain the head of water approximately 2.5 inches below the die in addition to which an air pressure of 3 inches of water was maintained in the tube. The irradiation dosage was approximately 10 megarep, feed rolls 32 were rotated at a surface speed of 18 ft./min., deflate rolls 34 were rotated at a surface speed of 63 ft./min., and air bubble 38 had a diameter of 10.5 inches. The transverse stretch was 3.5 to 1 and the longitudinal stretch also was 3.5 to 1. The finished film had a thickness of 0.8 mil. The properties of the product were similar to those of the product of Example 1. The primary differences were that in Example 3 the product had a tensile strength at 93° C. of 2000 p.s.i., an elongation at 21° C. of 150%; a shrink at 96° C. of 40% in the transverse direction and of 40% in the longitudinal direction.

*Example 4*

Using the apparatus described in FIGURE 2 Alathon 14 was extruded at a temperature of 149° C. at an extrusion rate of 30 lbs./hr. to form a tube having a wall thickness of 6 mils and a tube diameter of 6 inches using a die diameter of 2 inches. The bubble 52 was blown into air at ambient temperature of 21° C. and the deflate rolls 54 were at a distance of 10 bubble diameters from the die face. Rolls 54 were rotating at a surface speed of 11 ft./min. Air essentially at ambient temperature was fed through a duct in the die to maintain a pressure equivalent to approximately 5 inches of water in the bubble. The tubing was passed under the beam of the electron accelerator 22 operating at $1 \times 10^6$ volts to give a dosage of 10 megarad. The temperature in the vault 20 was maintained at 21° C. The hot bath 30 contained water maintained at 93° C. Feed rolls 32 rotated at a surface speed of 11.5 ft./min. and deflate rolls 34 at a surface speed of 40 ft./min. Air bubble 38 in its main portion had a diameter of 21 inches. The transverse stretch was 3.5 to 1 and the longitudinal stretch 3.5 to 1. The finished tubing had a thickness of 0.5 mil. The properties of the product were similar to those of the product of Example 1 but the following differences were noted.

The product of Example 4 had a tensile strength at 93° C. of 2,000 p.s.i.; an elongation at 21° C. of 150%; a shrink at 96° C. of 30% in the transverse direction and of 40% in the longitudinal direction.

*Example 5*

Example 1 was repeated with the following changes. Instead of using an electron accelerator, a cobalt 60 source was used. The tubing after emerging from pinch rolls 10 was wound up on a roll and placed in a hot cell with a cylindrical cobalt 60 source concentric with the roll of flattened tubing. The roll was irradiated for 133 hours at a flux of 90,000 roentgens/hr. for an average dose of 12 megarep. The thus irradiated tubing was then passed into hot bath 30, through feed rolls 32 and expanded exactly as in Example 1.

*Example 6*

The tubing of Example 2 was cut into sections and one end of each section heat sealed to form a bag. A turkey was placed in the bag, the bag evacuated and the open end of the bag closed. Then the bag was dipped in 96° C. water to shrink the container to conform to the turkey.

*Example 7*

Another portion of the tubing of Example 1 was slit to form a film. The film was used to wrap chopped sirloin in an open cardboard container. The ends of the film were heat sealed at the back of the cardboard container to form a wrinkle-free package, and provide an excellent multi-layer seal.

*Example 8*

In this example and referring to FIGURE 2, the semi-molten polyethylene is discharged from the extrusion nozzle 4 having enough body to be expanded and a temperature of 138° C., and formed into a bubble as shown at 52 in FIGURE 2 in the air to obtain biaxial orientation. The bubble is cooled in the air as in FIGURE 2 whereupon the tube so formed is again expanded into a bubble as shown in FIGURES 1 and 2 being thus first passed through hot water at about 88° C. in tank 46 and this second biaxial orientation or stretching gives a high shrink tension which it will be noted is at a lower temperature than used in the first racking stage.

We find from other runs according to this same example that the initial biaxial orientation step treatment of the molten polyethylene is successfully carried out with the polyethylene at temperatures between about 115° C. to 160° C. Also we have used successfully in this example and in the other runs cold water at 10° C. instead of the cooling of the bubble in the air as described. Further, we have made runs in accordance with this example and the other runs referred to wherein the hot water in the bath 46 for the final racking has a temperature between about 70° C. and 100° C.

In Example 8 as shown above, no irradiation was employed but in a further example we irradiated the semi-molten polyethylene from nozzle 4 as it issues therefrom using about 12 megarads and then continued the process as described in this example and the other runs.

As an additional example we irradiated the molten material preferably by a mild irradiation to prevent bubbles being formed in the plastic itself as it was discharged from the nozzle and followed the procedure of FIGURE 2, resulting in double irradiation and double stretching or racking. The first biaxial orientation step is sometimes omitted. Also the initial irradiation is strong enough in some cases and the second irradiation is omitted.

As a final example in this connection we irradiated the molten material issuing from the nozzle 4 and then followed the procedure of FIGURE 1, cooling, irradiation of the molten material and single racking. Sometimes the second irradiation is omitted as described above.

In carrying out the irradiation of the molten polyethylene as described in this example, the extruder was set up under the irradiating apparatus and irradiation successfully conducted.

In connection with this example we have successfully carried out the initial racking of the molten polyethylene in an atmosphere of chlorine gas at the outlet of the extruding die and in addition to chlorination we have also conducted the irradiation at the nozzle as described above upon the molten polyethylene in an atmosphere of chlorine.

Where initial biaxial orientation is employed, the extruded polyethylene is in a semi-molten condition having a temperature of 115° C. to 160° C. and the subsequent stretching in the lower temperature range of 70° C. to 100° C. results in a high shrink energy being imparted to the polyethylene.

The initial irradiation namely upon the polyethylene issuing from the extrusion nozzle as a tube as stated, in some cases is adequate so as to not require the second or subsequent irradiation, as provided when either the process of FIGURE 1 or the process of FIGURE 2 are followed after the initial radiation at the nozzle.

*Example 9*

Commercial low density polyethylene tubing 0.5 inch internal diameter and 60 mil wall thickness was irradiated by a 3 million volt Van der Graaff generator to a dosage of 16 megarad. It was then racked in a bath of propylene glycol at a temperature of 104° F. to form a bubble 4 inches in diameter with approximately 95% of the expansion taking place in the bath. The resulting tube thickness was 4 mils. The transverse stretch was 8 to 1 and the longitudinal stretch was 2 to 1.

In following Examples 10–29 the same procedure as Example 1 was employed with the changes indicated in the table while in Examples 30 and 31 the same procedure as Example 4 was employed with the changes indicated. In all examples the hot bath roll speed was identical with the speed of roll 10 or 54 as the case might be.

addition it is more difficult to control the uniformity of the final bubble and also more difficult to control the gauge of the final film.

A comparison of properties of a representative poly-

| Example Number | 1 | 10 | 11 | 12 | 13 | 14 | 15 | 16 | 17 | 18 | 19 [a,b] | 20 |
|---|---|---|---|---|---|---|---|---|---|---|---|---|
| Extrusion temperature, °C | 150 | | | 205 | | | | | | | | |
| Material | 1 | 2 | 3 | 4 | 5 | 6 | 7 | 8 | 9 | 10 | 1 | 1 |
| Tube thickness (mils) | 10 | 4 | 6 | | | | | | | | | |
| Tube diameter (inches) | 3.5 | 2 | 2 | | | | | | | | | |
| Die diameter (inches) | 4 | 3 | 3 | | | | | | | | | |
| Water bath level below die (inches) | 2 | 4 | 4 | | | | | | | | | |
| Water in tube below die (inches) | 2 | 3 | 3 | | | | | | | | | |
| Roll speed (ft./minute) | 23 | 3 | 3 | 20 | | | | | | | 10 | |
| Longitudinal stretch, percent | 200 | | | | | | | | | | | |
| Cold bath temperature, °C | 15 | | 60 | | | | | | | | 60 | |
| Beam voltage (megavolts) | 1 | | | | | | | | | | 2 | 1 |
| Dose (megarep.) | 12 | | 10 | 10 | | | | | | | 50 | 8 |
| Vault temperature, °C | 21 | | | | | | | | | | 60 | |
| Racking temperature, °C | 96 | 125 | 175 | | | | | | | | 99 | |
| Deflate roll speed (ft./minute) | 72 | 9 | 9 | 60 | | | | | | | 20 | 40 |
| Bubble diameter (inches) | 17.5 | 82 | 8 | | | | | | | | 10.5 | 17.5 |
| Percent expansion in bath | 85 | 90 | 90 | | | | | | | | 95 | |
| Trans. stretch ratio | 5 | 4 | 4 | | | | | | | | 3 | 5 |
| Longitudinal stretch ratio | 3 | 3 | 3 | | | | | | | | 2 | 4 |
| Tube wall thickness (mils) | 0.7 | 0.3 | 0.5 | | | | | | | | 1.5 | 0.5 |

| Example Number | 21 | 22 [c] | 23 | 24 | 25 | 26 | 27 [d] | 28 [a,e] | 29 [f] | 4 | 30 | 31 |
|---|---|---|---|---|---|---|---|---|---|---|---|---|
| Extrusion temperature, °C | | | | 120 | | 175 | | | 245 | 149 | | |
| Material | 1 | 11 | 12 | 1 | 1 | 13 | 1 | 1 | 14 | 1 | 1 | 1 |
| Tube thickness (mils) | | | | 4 | | | | | 6 | 6 | 6 | 10 |
| Tube diameter (inches) | 8 | | | | 1.75 | | | | 0.75 | 6 | 8 | |
| Die diameter (inches) | 8 | | | | 4 | | | | 1.5 | 2 | | |
| Water bath level below die (inches) | | | | | 6 | | | | 4 | x | x | x |
| Water in tube below die (inches) | | | | | 5.5 | | | | 3 | x | x | x |
| Roll speed (ft./minute) | 33 | 10 | 10 | 10 | 10 | 10 | | | 9 | 11 | 4 | 3 |
| Longitudinal stretch, percent | | | | | 500 | | | | 300 | 200 | 300 | |
| Cold bath temperature, °C | 2 | | | | | | | | | x | x | x |
| Beam voltage (megavolts) | 1 | | | | | | | | | 1 | | |
| Dose (megarep.) | 12 | 10 | 10 | | | | | | 2 | 10 | | |
| Vault temperature, °C | | | | | | | | | | 21 | | |
| Racking temperature, °C | 96 | 88 | 96 | | | 110 | | | 143 | 93 | 90 | 96 |
| Deflate roll speed (ft./minute) | 100 | 30 | 30 | 30 | 30 | 30 | | | 27 | 40 | 12 | 15 |
| Bubble diameter (inches) | 40 | 14 | | | 10.5 | | | | 4.5 | 21 | 24 | 24 |
| Percent expansion in bath | | | | | | | | | 95 | 80 | | |
| Trans. stretch ratio | | 4 | | | 6 | | | | 6 | 3.5 | 3 | 4 |
| Longitudinal stretch ratio | | | | | 3 | | | | 3 | 3.5 | 3 | 5 |
| Tube wall thickness (mils) | | 0.8 | | 0.25 | 0.5 | | | | 0.3 | 0.5 | 0.7 | 0.5 |

MATERIAL CODE:
1. Alathon 14, polyethylene of density 0.916 and molecular weight about 20,000.
2. Spencer Hi-D, polyethylene of density 0.935.
3. Grex, polyethylene of density 0.96.
4. Tenite 818, polyethylene of density 0.916, containing a slip additive.
5. Blend of 20% AC polyethylene of mol. wt. 2,000 and 80% Alathon 14.
6. Tenite 807, polyethylene of density 0.916, mol. wt.—27,000.
7. Tenite 800, polyethylene of density 0.916, mol. wt.—30,000.
8. Tenite 831, poly. of density 0.916, mol. wt.—32,000.
9. Tenite 809, poly. of density 0.916, mol. wt.—34,000.
10. Tenite 810, poly. of density 0.916, mol. wt.—38,000.
11. Dow 510, polyethylene of density 0.916.
12. Spencer 2205, polyethylene of density 0.916.
13. Tenite 860, polyethylene of density 0.925, mol. wt.—21,000.
14. Hoechst polypropylene of density 0.90.

FOOTNOTES FROM TABLE:
[a] In these cases the tubing was wound up and unwound before and after irradiation.
[b] The resulting film had a shrink energy at 96° C. of 500 p.s.i.
[c] In this case, the cooling medium recirculating in the freshly extruded tubing was a suspension of 10% talc, with approximately 2% of a wetting agent.
[d] Prior to extruding the original polymer, 0.2% of Orange Pigment YT582D, made by Du Pont Chemical Company, was blended in and the resulting final tubular film was orange in color.
[e] Immediately after irradiation the tube was treated in an atmosphere of chlorine gas until it had gained 1.5% in weight. The tubing was subsequently racked according to the process.
[f] This example was repeated using a dosage of 6 megarep. with similar results.
x Not applicable to apparatus employed in this example.

It is possible to rack polyethylene to obtain high shrink energy without irradiation although such a process is not the equivalent of the irradiation and racking technique previously described. In such a procedure preferably with the apparatus of FIGURE 2 being employed the irradiation chamber is omitted and the tubing after leaving deflate rolls 54 passes over guide rolls 18 directly to the feed rolls 32. This procedure of hot blowing and subsequent racking is much superior to conventional hot blowing in that there is a greatly improved tensile strength, particularly at room temperature, and a marked improvement in shink energy at 96° C. and improvement in optical properties, notably better gloss and better transparency. However, the hot blown and racked, unirradiated polyethylene does not have as great a tensile strength at either room temperature or elevated temperature as the irradiated product. Furthermore the shrink energy is not as great nor are the gloss and transparency as good. In ethylene, namely Alathon 14, which had been subjected to (1) a conventional hot blowing, (2) hot blowing and racking and (3) hot blowing and racking with an intermediate irradiation of 12 megarep is given in the following table:

| | (1) Hot blown | (2) Hot blown and racked | (3) Hot blown, racked and irradiated |
|---|---|---|---|
| Tensile, room temperature, p.s.i. | 2,000 | 6,000 | 8,000. |
| Tensile, 93° C., p.s.i. | 200 | 500 | 2,500. |
| Shrink energy, 96° C., p.s.i. | 10 | 300 | 400. |
| Optical gloss | Poor | Good | Excellent. |
| Optical transparency | do | do | Do. |
| Oxygen transmission | 9,000 | 6,000 | 6,000. |
| Heat sealing | Good | Good | Excellent. |

The hot blowing and racking procedure is similar to the irradiation procedure in that it can be carried out either intermittently or continuously.

It has been found critical to employ the hot blowing and racking procedure or to biaxially orient using the apparatus of FIGURE 1 omitting the irradiation chamber in order to obtain high shrink energy.

The hot blowing imparts substantial bilateral orientation to the polyethylene tubing, such orientation preferably being approximately the same in both directions. Without such initial biaxial orientation this process is ineffective. The polyethylene as it comes from the extruder and is expanded to form the bubble is too hot to have substantial strength. Hence at this time it is impossible to operate at a low enough temperature to impart high shrink energy to the polyethylene. After cooling and collapsing the bubble then a new bubble can be formed at a lower temperature and a higher internal pressure to impart the desired higher shrink energy. The polyethylene as it comes from the extruder is in the molten condition, generally 115–160° C. with standard low density polyethylene, rapidly cools to about 90–95° C. as the tubing is stretched bilaterally. In forming the second bubble the water or other liquid is maintained at about 70 to 100° C., preferably about 85 to 90° C. The bubble should have 50 to 95% of its maximum diameter, preferably 80 to 95%, formed in the liquid with the balance occurring after the tubing emerges from the bath.

*Example A*

Using the apparatus described in FIGURE 2 but omitting the irradiation chamber Alathon 14 was extruded at a temperature of 150° C. to form a tube having a wall thickness of 8 mils and a tube diameter of 3.75 inches using a die diameter of 2 inches. The bubble 52 was blown into air at 21° C. and the deflate rolls 54 were at a distance of 5 bubble diameters from the die face. Rolls 54 were rotating at a surface speed of 12 ft./min. Air at 21° C. was fed through a duct in the die to maintain a pressure equivalent to approximately 5 inches of water in the bubble. After leaving rolls 54 the tubing passed over guide rolls 18 and into hot bath 30 containing water at 88° C. Feed rolls 32 rotated at a surface speed of 12 ft./min. and deflate rolls 34 at a surface speed of 24 ft./min. Air bubble 38 in its main portion had a diameter of 7.5 inches. Approximately 75% of the expansion occurred in the bath. The transverse stretch was 2 to 1 and the longitudinal stretch was 2 to 1. The finished tubing had a thickness of 2 mils. The product has a tensile strength at 21° C. of 5000 p.s.i.; and at 93° C. of 500 p.s.i.; a shrink energy at 96° C. of 250 p.s.i.; a shrink at 96° C. of 40% in the transverse direction and 30% in the longitudinal (or machine) direction, sealing range 110–150° C.

*Example B*

The procedure of Example A was followed with the changes noted below:

As the polyethylene Tenite 800 (density 0.915, mol. wt. 30,000) was employed, the tubing had a thickness of 4 mils, the tubing diameter was 2.5 inches, the die diameter was 1.25 inches, the deflate rolls 54 were 8 bubble diameters from the die and rotated at a surface speed of 5 ft./min. Feed rolls 32 rotated at a surface speed of 5 ft./min. and deflate rolls 34 at a surface speed of 10 ft./min. Air bubble 38 had a diameter of 5 inches. The final tube had a thickness of 1 mil.

With polypropylene it has surprisingly been found that high shrink energy can be imparted without the use of irradiation and with only racking although both hot blowing and racking can be employed if desired. Thus there can be used the apparatus of either FIGURE 1 or FIGURE 2 with the omission of the irradiation chamber.

The tubing after leaving rolls 10 (FIGURE 1) or deflate rolls 54 (FIGURE 2) passes over guide rolls 18 directly to the feed rolls 32.

The polyproylene is extruded in the molten condition, e.g., 175–260° C., and is then quenched to room temperature or below, e.g., 10° C., as shown in FIGURES 1 and 2. The racking to form bubble 38 is accomplished by utilizing a liquid such as propylene glycol or other relatively inert liquid at a temperature of 130 to 150° C. Generally the bubble has 50 to 95° of its maximum diameter formed in the liquid with the balance occurring after the tubing emerges from the bath.

*Example C*

Using the apparatus of FIGURE 1 omitting the irradiation chamber polypropylene (Hoechst, density 0.90) was extruded at a temperature of 245° C. to form a tube having a wall thickness of 6 mils and a tube diameter of 0.75 inch using a die diameter of 1.5 inches. Cooling bath 8 was filled with water maintained at 21° C. The distance between the die orifice and the surface of the bath was 4 inches. Rolls 10 were rotating at a surface speed of 9 ft./min.

The longitudinal stretch between die 4 and rolls 10 was 300%. Water at a temperature of 21° C. was recirculated through ducts 14 and 15 to maintain the head of liquid at approximately 3 inches below the die. The tubing then passed over rolls 18 into hot bath 30 containing propylene glycol maintained at 140° C. Feed rolls 32 rotated at a surface speed of 9 ft./min. and deflate rolls 34 at a surface speed of 27 ft./min. Air bubble 38 in its main portion had a diameter of 6 inches and 85% of the expansion occurred in the bath. The transverse stretch was 8 to 1 and the longitudinal stretch was 3 to 1. The finished tubing had a wall thickness of approximately 0.25 mil.

Figure 10:
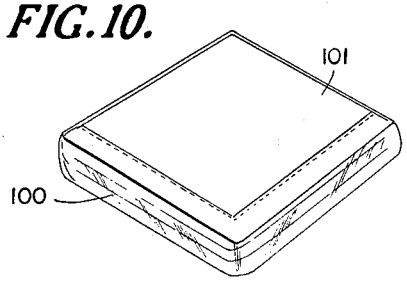
FIGURE 10 is a view showing a compressible item such as a blanket bound with a material of the present invention and shrunk thereon, this binding being in the form of a complete sealed wrap or a simple tubular wrap.

Referring to FIGURE 10 I have illustrated a compressible item such as a blanket 100 bound, i.e., wrapped in a material 101 prepared by this invention and shrunk upon the blanket to maintain the same seal wrapped. Instead of a completely wrapped blanket, a simple tube of material 101 may be shrunk upon the blanket 100 to bind the same. Further the blanket can be wrapped loosely as shown in FIGURE 8 either with a complete wrap or a tube and the enclosure then shrunk upon the blanket as shown in FIGURE 9.

What is claimed is:

1. A process of preparing a package comprising the steps of (1) loosely wrapping a band of a polymer selected from the group consisting of biaxially oriented polyethylene and biaxially oriented polypropylene around a multiplicity of articles, the ends of the articles extending beyond the wrapped portion, (2) heat sealing the band to form a sleeve and (3) heat shrinking the sleeve of polymer to tightly retain the articles in their mid portion.

2. A process according to claim 1 wherein the polymer employed prior to shrinking is biaxially oriented irradiated polyethylene having a tensile strength of at least 4000 p.s.i. at 21° C. and a shrink energy of at least 100 p.s.i. in each direction at 96° C. and a percent shrink at 96° C. of at least 20 in each direction.

References Cited in the file of this patent

UNITED STATES PATENTS

| | | |
|---|---|---|
| 542,479 | Carkeek | Aug. 14, 1894 |
| 2,235,912 | Winslow | Mar. 25, 1941 |
| 2,255,810 | Replogle | Sept. 16, 1941 |
| 2,613,487 | Vaughn | Oct. 14, 1952 |
| 2,736,656 | Marshall | Feb. 28, 1956 |
| 2,877,500 | Rainer et al. | Mar. 17, 1959 |
| 2,967,383 | Rumsey | Jan. 10, 1961 |